United States Patent [19]

Watanabe et al.

[11] Patent Number: 5,428,271
[45] Date of Patent: Jun. 27, 1995

[54] SINE WAVE DEFLECTING CIRCUIT

[75] Inventors: Junzo Watanabe; Hitoshi Suzuki, both of Kanagawa, Japan

[73] Assignee: Sony Corporation, Tokyo, Japan

[21] Appl. No.: 239,945

[22] Filed: May 9, 1994

Related U.S. Application Data

[63] Continuation of Ser. No. 974,257, Nov. 12, 1992, abandoned.

[30] Foreign Application Priority Data

Nov. 15, 1991 [JP] Japan .................................. 3-327002

[51] Int. Cl.⁶ .......................... G09G 1/04; H01J 29/70
[52] U.S. Cl. ........................ 315/396; 315/378; 315/408
[58] Field of Search ................ 315/378, 396–397, 315/408, 395, 398; 307/228

[56] References Cited

U.S. PATENT DOCUMENTS

| | | | |
|---|---|---|---|
| 4,634,940 | 1/1987 | Groeneweg et al. | 315/408 |
| 4,956,585 | 9/1990 | Rilly | 315/371 |
| 5,051,668 | 9/1991 | Kawaberi et al. | 315/408 |

Primary Examiner—Gregory C. Issing
Attorney, Agent, or Firm—Jay H. Maioli

[57] ABSTRACT

There is provided a sine wave deflecting circuit having a resonance circuit comprising a deflecting coil and a resonance capacitor and a circuit for detecting a signal waveform of the resonance circuit and for driving the resonance circuit on the basis of the detection signal, in which the deflecting coil is sine-wave driven by the self-oscillation. A rectangular wave driving circuit which is constructed by connecting first and second switching elements such as FETs through a capacitor is provided at one end of the deflecting coil.

4 Claims, 10 Drawing Sheets

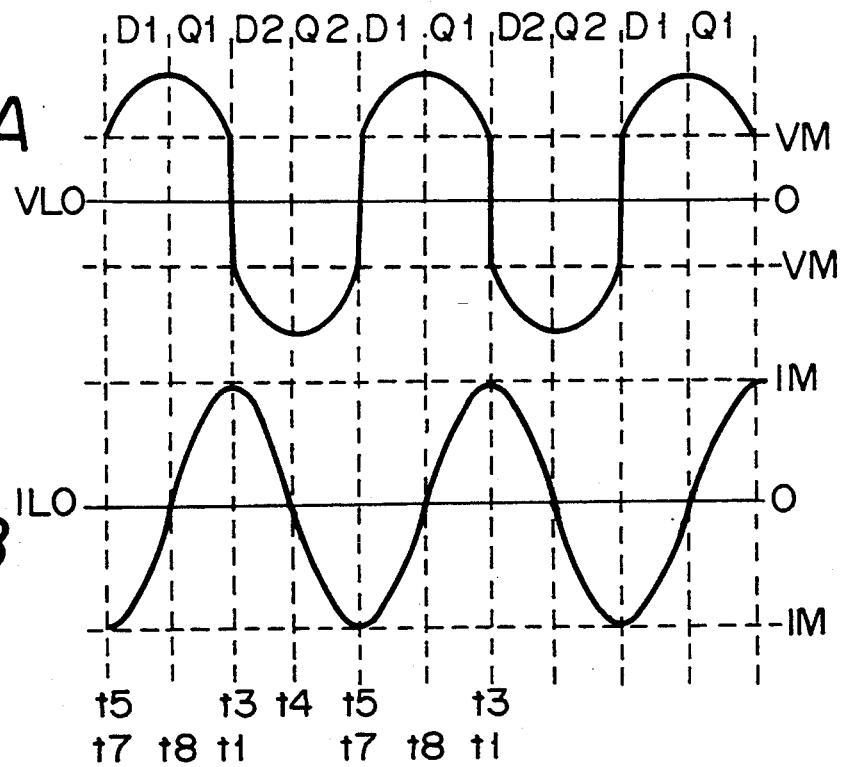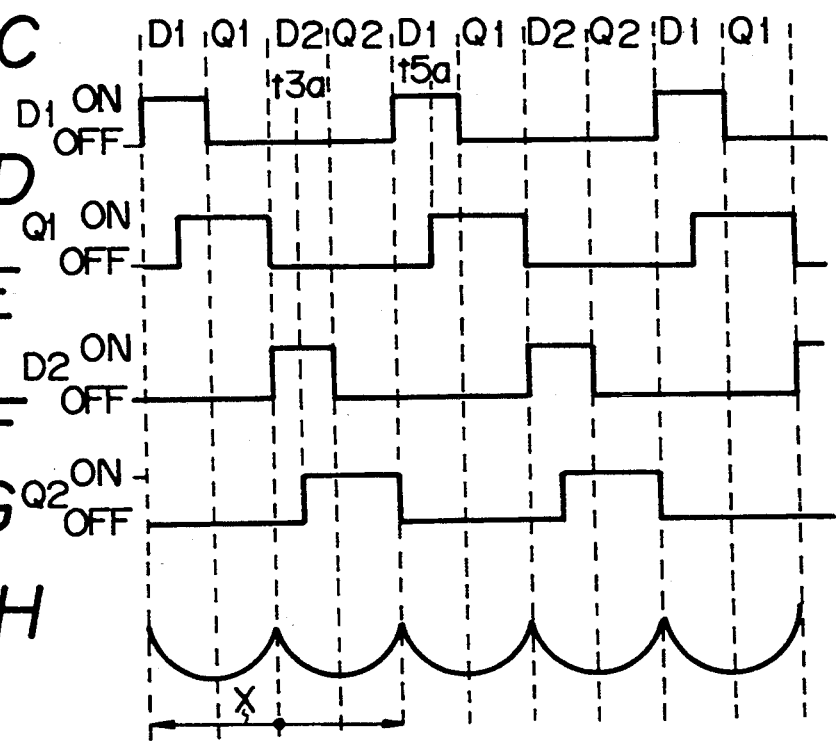

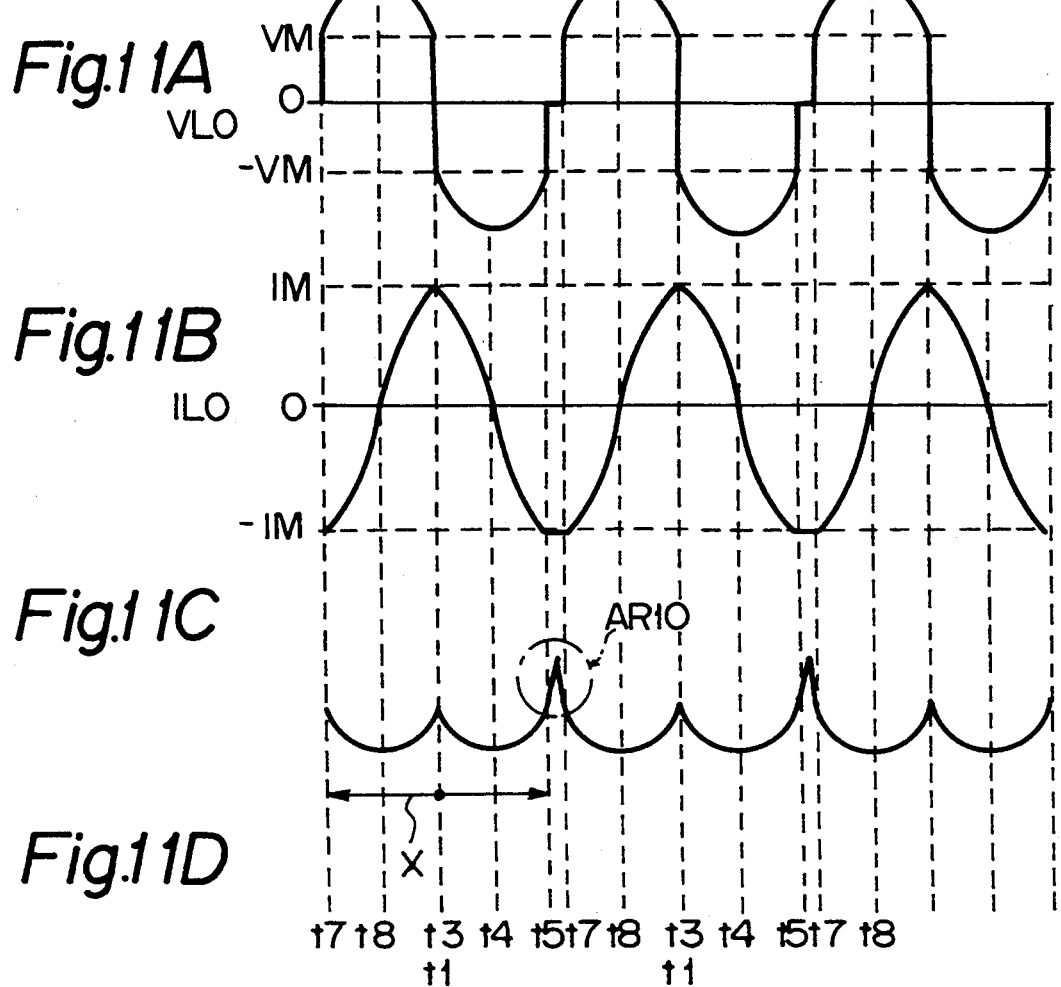

SINE WAVE DEFLECTING CIRCUIT

This is a continuation of application Ser. No. 07/974,257 filed Nov. 12, 1992 now abandoned.

BACKGROUND OF THE INVENTION

1. Field of the Invention

The invention relates to a sine wave deflecting circuit, more particularly, to a sine wave deflecting circuit suitable for a CRT display.

2. Description of the Prior Art

A sine wave deflecting circuit using LC resonance, namely, what is called a bidirectional deflecting circuit is known. FIG. 1 shows an example of such a sine wave deflecting circuit. FIG. 2 shows waveform of a voltage VL0 which is generated across both ends of a deflecting yoke of the sine wave deflecting circuit, a current IL0 flowing in the deflecting yoke, and a pulse PEG, which will be explained hereinlater.

In a construction of FIG. 1, the power source voltage V+B is supplied to a pin distortion correcting circuit 76 through a terminal 75. In the pin distortion correcting circuit 76, a signal of a parabolic waveform of a vertical scanning period is formed. An output terminal of the pin distortion correcting circuit 76 is connected to a drain of an FET 78 through a coil 77.

A capacitor 79 and a damper diode 80 are connected in parallel with the drain of the FET 78. A capacitor 81 and a coil 82 which are connected in series are connected to the drain of the FET 78. The capacitor 81 is used to cut out a DC component. The coil 82 is used to smooth the signal. A gate terminal of the FET 78 is connected to a driving circuit 85. A source terminal of the FET 78 is connected to ground.

A driving section 71 is formed by the above FET 78, capacitor 79 and 81, coils 77 and 82, damper diode 80, driving circuit 85, and the like.

Capacitors 86 and 87 are serially connected to the other end side of the coil 82. The other end side of the capacitor 87 is connected to ground. A coil 88 as a deflecting yoke and a resistor 89 to detect the sine wave-shaped deflection current IL0 are serially connected to the other end side of the coil 82. The other end side of the resistor 89 is connected to ground. A capacitor 90 is connected to the other end side of the coil 82. The other end side of the capacitor 90 is connected to ground. The capacitor 90 constructs a parallel resonance circuit 95 together with the foregoing coil 88. Further, a switching circuit 93 comprising a diode 91 and an FET 92 is connected to the other end side of the coil 82.

In the switching circuit 93, an anode of the diode 91 is connected to the other end side of the coil 82. A cathode of the diode 91 is connected to a drain of the FET 92. A source of the FET 92 is connected to ground. A gate of the FET 92 is connected to an AFC control circuit 99.

The foregoing coil 88 and capacitor 90 perform the parallel resonance. The sine wave-shaped deflection current IL0 shown in FIG. 2B and generated by the resonance is used as a bidirectional current. The voltage VL0 shown in FIG. 2A and generated across both ends of the coil 88 is divided by the capacitors 86 and 87.

The voltage which is obtained from a middle point P3C between the coil 88 and the resistor 89 is supplied to the AFC control circuit 99. The voltage which is derived from a middle point P2C between the capacitors 86 and 87 is supplied to the AFC control circuit 99 and the driving circuit 85.

The AFC control circuit 99 controls the switching circuit 93 on the basis of the voltage obtained from the middle points P3C and P2C, thereby controlling a frequency (phase) so as not to change the amplitude of the deflection current IL0. In the driving circuit 85, when a predetermined time has passed after the voltage derived from the middle point P2C rises to a level higher than a predetermined threshold level, a control signal SCN10 to turn on the FET 78 is formed. The control signal SCN10 is supplied to the gate of the FET 78.

When the control signal SCN10 is supplied to the gate of the FET 78, the FET 78 is turned on and a signal which is generated from the pin distortion correcting circuit 76 flows to ground from the coil 77 and the drain of the FET 78 through the source thereof, so that the potential of the drain (at point P1 in FIG. 1) drops. Consequently, the potentials at points P2 and P3 on one end side of the capacitor 86 and coil 88 decrease and the potentials at the middle points P2C and P3C also drop. The potential at the middle point P2C is returned to the driving circuit 85.

The driving circuit 85 forms a control signal SCF10 to turn off the FET 78 when a predetermined time has passed after the potential at the middle point P2C is lower than a predetermined threshold level. The control signal SCF10 is supplied to the gate of the FET 78. When the control signal SCF10 is supplied to the gate of the FET 78, the FET 78 is turned off. When the FET 78 is turned off, the pulse PEG shown in FIG. 2C is formed by the operations of the capacitor 79, damper diode 80, and the like. The pulse PEG is supplied to the resonance circuit 95 as an energy to continue the resonance function. By repeating the above operations, the oscillation is continued.

The operation of the switching circuit 93 will now be described. The switching circuit 93 performs the AFC control by forming a rest interval, which will be explained hereinlater.

At an arbitrary timing after a time point t3 and before a time point t4 in FIGS. 2A and 2B, the AFC control circuit 99 forms a control signal SCN 20 to turn on the FET 92. The control signal SCN 20 is supplied to the gate of the FET 92. Time point t3 in FIGS. 2A and 2B is a time point when a state in which the deflection current IL0 is equal to 0 as detected as a voltage at the middle point P3C and a state in which the voltage VL0 is set to the maximum level on the negative side as detected at the middle point P2C. Time point t4 in FIGS. 2A and 2B is a time point when a state in which the voltage VL0 is equal to 0 is detected as a voltage at the middle point P2C and a state in which the defection current IL0 as set to the maximum level on the negative side is detected at the middle point P3C.

The FET 92 as turned on when the control signal SCN20 is supplied. On the other hand, the diode 91 is automatically turned on at a time point t4. Therefore, both ends of the coil 88 are short-circuited by the switching circuit 93. Thus, the energy accumulated in the coil 88 flows as a current IL0 along a path of the switching circuit 93, ground, resistor 89, and coil 88 and the energy is preserved.

At a time point t5, the AFC control circuit 99 forms a control signal SCF20 to turn off the FET 92. The control signal SCF20 is supplied to the gate of the FET 92. The FET 92 is turned off when the control signal SCF20 is supplied. Therefore, the switching circuit 93 is shut off and the path of the deflection current IL0 is shut off. As shown in FIGS. 2A and 2B, accordingly, a state of the voltage VL0 (=0) and the current IL0 (=the maximum level in the negative direction and the predetermined level) continues for a period of time between time points t4 and t5. That is, the period of time between t4 and t5 is the rest interval during which the resonance is stopped. By providing such a rest interval, an apparent resonance frequency can be changed and the AFC control can be performed.

For instance, in the waveform of the voltage VL0 shown in FIG. 2A, assuming that a period of time between t0 and t5 is set to one period, a period of time between t0 and t4 is a free resonance period of time and a period of time between t4 and t5 is a rest interval. Therefore, by controlling a duration of the rest interval and by maintaining the state in which all of the resonance energies in the rest interval are accumulated in the coil 88, the apparent resonance frequency can be changed and the AFC control can be performed.

There is a problem such that when the bidirectional deflection as mentioned above is executed, if a pure sine wave is used as a deflection current and the video signal is merely inverted every 1H, the image is extremely contracted at both edges of the screen on a CRT display.

A method of compressing the time base of the video signal is considered as one of countermeasures to prevent the image being extremely contracted at both edges of the screen as mentioned above. According to this method, by time-base compressing the video signal to about 80% of the ordinary signal, an overscan amount is adjusted so as to optimize the linearlity in accordance with the shape of each CRT, distance from the center of the deflection, and the like.

However, the time-base compression of the video signal denotes that the time during which the beam scans on the screen surface is reduced. Therefore, to set the brightness of the screen surface to a value similar to that of the ordinary television receiver, a beam current or a driving amount must be increased. However, there is a problem such that when the beam current or the driving amount is increased, a spot shape of beam is deteriorated and focusing characteristics are deteriorated or the life of the CRT is reduced. Since the horizontal scanning frequency rises by the time-base compression of the video signal, there is a problem such that the frequency characteristics of the signal processing system or the circuit to drive the CRT must be improved or the digital processing speed must be improved.

As another countermeasure, there is considered a method whereby a radius of curvature of the glass surface of the CRT screen is increased or a deflection angle is increased without time-base compressing the video signal. In this case, however, there is a problem such that the M-character characteristics of the linearity becomes remarkable and a good result cannot be obtained.

As still another countermeasure, a method of modulating the time base of the video signal along the linearity is also considered. However, in this case, there are problems such that not only the circuit becomes complicated but also drawbacks such as variation in luminance, variation in resolution, and the like occur.

OBJECTS AND SUMMARY OF THE INVENTION

It is, therefore, an object of the invention to provide a sine wave deflecting circuit in which only a part of a sine wave occurring by the resonance can be taken out as a bidirectional deflection current by performing the AFC control.

According to an aspect of the invention, there is provided a sine wave deflecting circuit which has a resonance circuit comprising a deflecting coil and a resonance capacitor and a circuit for detecting a signal waveform of the resonance circuit and for driving the resonance circuit on the basis of the detection signal and in which the deflecting coil is sine-wave driven by a self-oscillation, wherein a rectangular wave driving circuit to which first and second switching elements are connected through a capacitor is provided at one end of the deflecting coil.

According to the invention, for a first period of time, the deflection current flows through the capacitor and first switching element which are connected to one end of the deflecting coil. Subsequently, in the second period of time, the deflection current flows in the direction opposite to that in the first period of time through the voltage forming/holding means, the second switching element, and the capacitor connected to one end of the deflecting coil.

The change of the path of the deflection current and the reversal of the flowing direction of the deflection current in the first and second periods of time are realized by the AFC control that is executed by controlling the operations of the first and second switching elements. The voltages having the same value and the different polarities are applied across both ends of the deflecting coil for the first and second periods of time by the AFC control. Thus, the inclination of the deflection current is reversed at the timing when the polarity of the voltage is inverted. Since the inclination of the deflection current is reversed at the timing before the magnitude of the deflection current reaches the peak portion on each of the positive and negative sides in the deflection current, only the portion of the best linearity in the pure sine wave is taken out as a waveform of the deflection current.

The above, and other, objects, features and advantage of the present invention will become readily apparent from the following detailed description thereof which is to be read in connection with the accompanying drawings.

BRIEF DESCRIPTION OF THE DRAWINGS

FIG. 8A to 8H are waveform diagram for explaining the operations of the sine wave deflecting circuit shown in FIG. 7;

FIGS. 11A to 11D are waveform diagrams for explaining the operations of the sine wave deflecting circuit shown in FIG. 10.

DETAILED DESCRIPTION OF THE PREFERRED EMBODIMENTS

Embodiment of the invention will be described hereinbelow with reference to the drawings.

Prior to explaining each embodiment of the invention, the principle of the invention will now be described with reference to FIGS. 3A to 6.

FIG. 3A shows the voltage VL0 across both ends of the deflecting coil. FIG. 3B shows the deflection current IL0 which is used for bidirectional deflection. Waveforms shown in FIGS. 3A and 3B are pure sine waves.

When the pure sine waves as shown in FIGS. 3A and 3B are used for the bidirectional deflection the image is extremely contracted at both edges of the screen, so that it is necessary to match the linearity of the screen. To match the linearity of the screen, only the portions other than the hatched ranges between time points t1 and t3 and between time points t5 and t7 in FIGS. 3A and 3B correspond to a conventional signal. In other words, the hatched ranges between time points t1 and t3 and between t5 and t7 in FIGS. 3A and 3B cannot be used as the effective picture plane and the ordinary overscan portions. Therefore, such ranges are referred to as superoverscan portions.

The hatched superoverscan portions between t1 and t3 and between t5 and t7 in FIGS. 3A and 3B are longer than the sum of the overscan times and the retrace time in the ordinary television receiver. Therefore, in case of displaying an image onto the screen of the ordinary image size, some countermeasures are needed. Although various kinds of countermeasures to display the image of the screen of the ordinary image size are considered as mentioned above, even if any one of those countermeasures is used, other new problems occur.

The above various kinds of countermeasures are considered on the assumption that the hatched superoverscan portions between time points t1 and t3 and between t5 and t7 in FIGS. 3A and 3B are used. When the superoverscan portions are used, however, various kinds of problems occur as mentioned above. It is, accordingly, presumed that the above various kinds of problems will not occur unless the superoverscan portions are used. That is, it is considered that when the deflection current IL0 and voltage VL0 shown in FIGS. 8A and 8B, which will be explained hereinlater, are formed while excluding the superoverscan portions and the deflection current IL0 and voltage VL0 are used as current and voltage for bidirectional deflection, various kinds of problems as mentioned above will not occur.

The principle in case of forming the deflection current IL0 and voltage VL0 of good linearity as shown in FIGS. 8A and 8B from the pure sine waves as shown in FIGS. 3A and 3B will now be described hereinbelow with reference to FIGS. 4 to 6.

Figure 1:
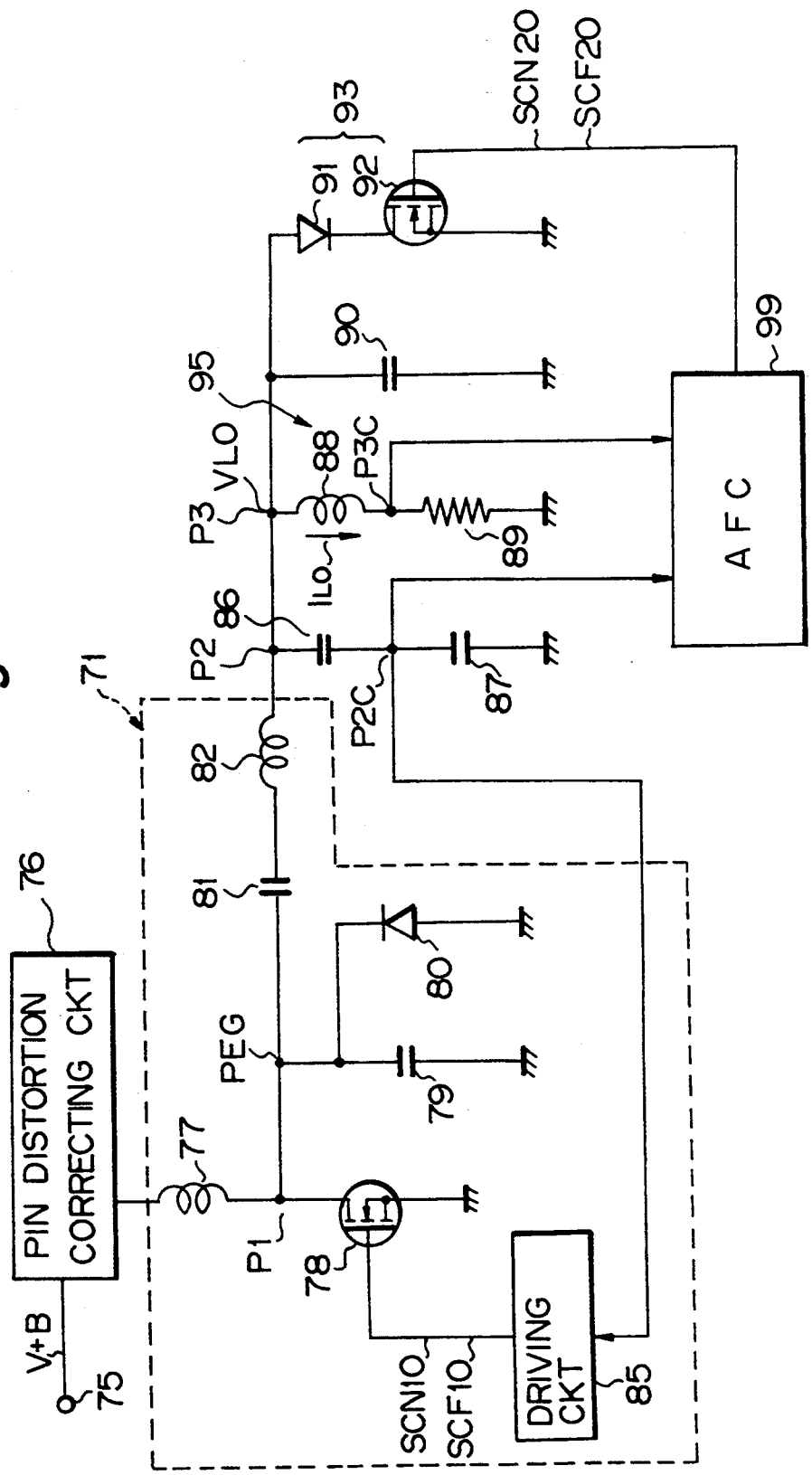
FIG. 1 is a block diagram showing a conventional sine wave deflection circuit.
Figure 2:
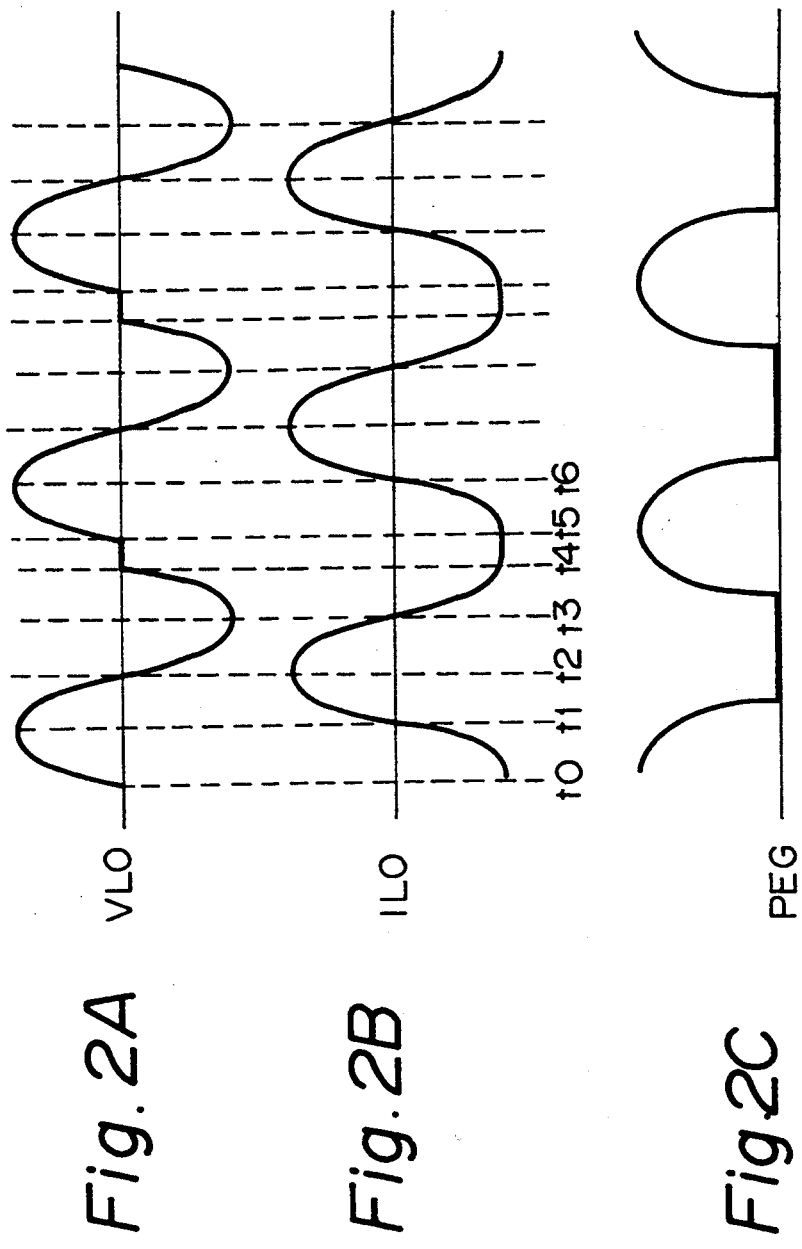
FIGS. 2A to 2C are waveform diagrams for explaining the operation of the conventional sine wave deflecting circuit shown in FIG. 1.
Figure 3:
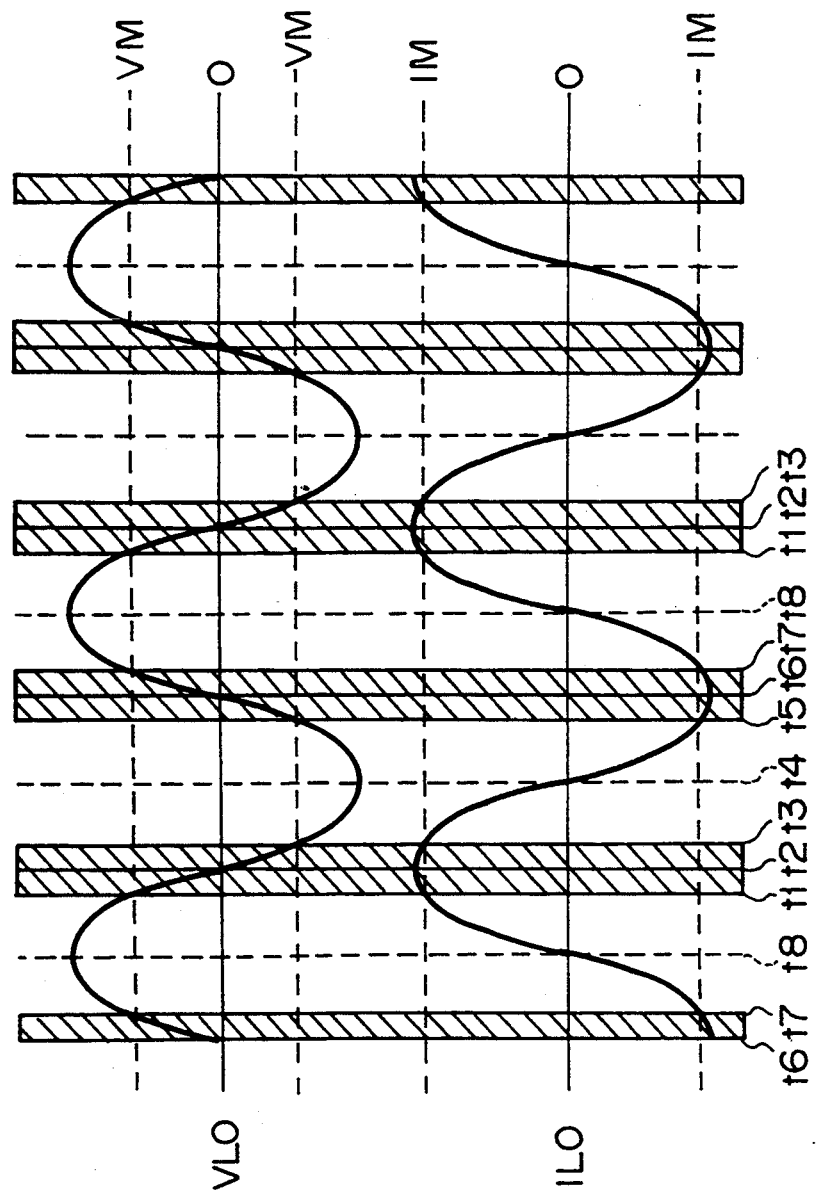
FIGS. 3A and 3B are waveform diagrams for explaining the principle of the invention.
Figure 4:
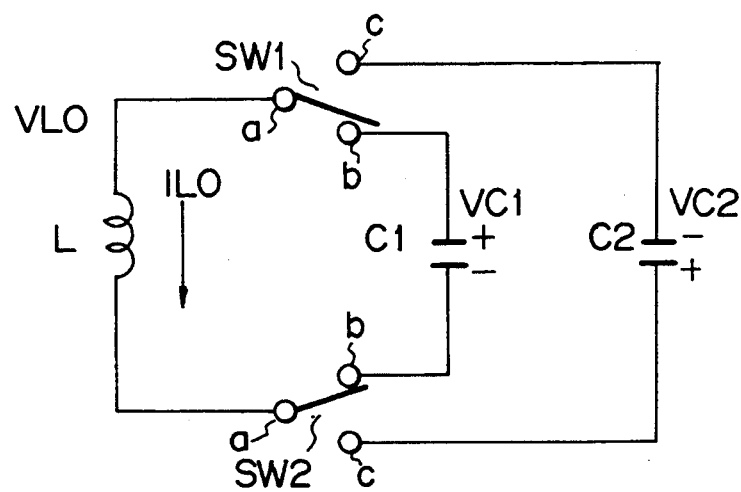
FIG. 4 is a circuit diagram for explaining the principle of the invention.

FIG. 4 is a circuit diagram showing the principle of this invention. All parts in FIG. 4 are assumed to be ideal parts. It is now assumed that in each of switches SW1 and SW2 in FIG. 4, terminals a and b are connected until time point t1 shown in FIGS. 3A and 3B, for instance, for a period of time from time points t7 to t1. It is also assumed that coil L and a capacitor C1 are resonant. Since ideal parts are assumed, the resonance continues permanently. The voltage VL0 across both ends of the coil L and the deflection current IL0 in this state have the waveforms shown in FIGS. 3A and 3B.

In the following description, it is assumed that VC, VC1, and VC2 denote voltages which are generated across both ends of the capacitors C, C1, and C2, VM denotes the absolute value of voltage which is generated across both ends of the coil L at time points t7, t1, t3, and t5 in FIG. 8A, and IM denotes the absolute value of current of the coil L at time points t7, t1, t3, and t5 in FIG. 8B.

The following equations are satisfied at time point t1 shown in FIGS. 3A and 3B.

$$VL0 = VC1 = VM$$

$$IL0 = IM$$

At time point t1, the connecting states of the switches SW1 and SW2 are controlled and it is assumed that the terminals a and c are connected in each of the switches SW1 and SW2. Here, as conditions in this instance, it is now assumed that the voltage VC2 accumulated in the capacitor C2 is [VC2 = −VM] and the capacitance of the capacitor C2 is [C2 = C1].

Now, assuming that the terminals a and c in each of the switches SW1 and SW2 are connected at time point t1, the voltage VL0 across both ends of the coil L is equal to the voltage [−VM] having the same absolute value and the opposite polarity. Although the flowing direction and the value of the deflection current IL0 does not change, the inclination of the deflection current IL0 is reversed and the deflection current changes from the increasing tendency to the decreasing tendency in the positive direction. This state is the same as the state at time point t3 shown in FIGS. 3A and 3B.

At time point t3 shown in FIGS. 3A and 3B, the following equations are satisfied.

$$VL0 = VC2 = [-VM]$$

$$IL0 = IM$$

The resonance circuit comprising the coil L and capacitor C2 restarts the resonance while using its state as an initial value. Since [C2 = C1] as mentioned above, the resonance frequency does not change. This is equivalent to instantly changing the state at time point t1 to the state at time point t3 by controlling the switches SW1 and SW2 at time point t1.

As shown in FIGS. 3A and 3B, the deflection current IL0 has a phase difference of 90° for that of the voltage VL0. Therefore, at time point t3, when the voltage VL0 of the coil L changes to [VL0 = −VM], the inclination of the deflection current IL0 is reversed and the deflection current changes from the increasing tendency to the decreasing tendency in the positive direction. After time point t4, the flowing direction of the deflection current IL0 changes from the positive direction to the negative direction and the level of the deflection current IL0 increases in the negative direction.

At time point t5, the connecting states of the switches SW1 and SW2 are controlled and the terminals a and b of each of the switches SW1 and SW2 are again connected. Here, as a condition in this instance, it is assumed that the voltage VC1 accumulated in the capacitor C1 is set to [VC1=VM].

At time point t5, when the terminals a and b of each of the switches SW1 and SW2 are connected, the voltage VL0 across ]both ends of the coil L is set to the voltage [VM] having the same absolute value and the opposite polarity. Although, the following direction and the value of the deflection current IL0 does not change, the inclination of the deflection current IL0 is reversed and the deflection current changes from the increasing tendency to the decreasing tendency. This state is the same as the state at time point t7 shown in FIGS. 3A and 3B.

Therefore, the resonance circuit comprising the coil L and capacitor. C2 again starts the resonance operation from the state at time point t7. Since [C2=C1] as mentioned above, the resonance frequency does not change. Thus, this is equivalent to instantly changing the state at time point t5 to the state at time point t7 by controlling the switches SW1 and SW2.

As mentioned above, the deflection current IL0 has a phase difference of 90° for that of the voltage VL0. Therefore, at time point t7, when the voltage VL0 changes to [VL0=−VM], although the flowing direction of the deflection current IL0 does not change, the inclination of the deflection current IL0 is reversed and the deflection current changes from the increasing tendency to the decreasing tendency in the negative direction. After time point t8, the flowing direction of the deflection current IL0 changes from the negative direction to the positive and the level of the deflection current IL0 increases in the positive direction. Thus, the state at time point t1 is reproduced thereafter.

Since the voltage VL0 across both ends of the coil L is subsequently periodically switched in a range between the voltages [VM] and [−VM], the remaining waveform in which the superoverscan portions have been eliminated, that is, the waveforms of the voltage VL0 and deflection current IL0 shown in FIGS. 8A and 8B can be formed. The voltage VL0 and deflection current IL0 can be used as a voltage and current for the bidirectional deflection.

Figure 5:
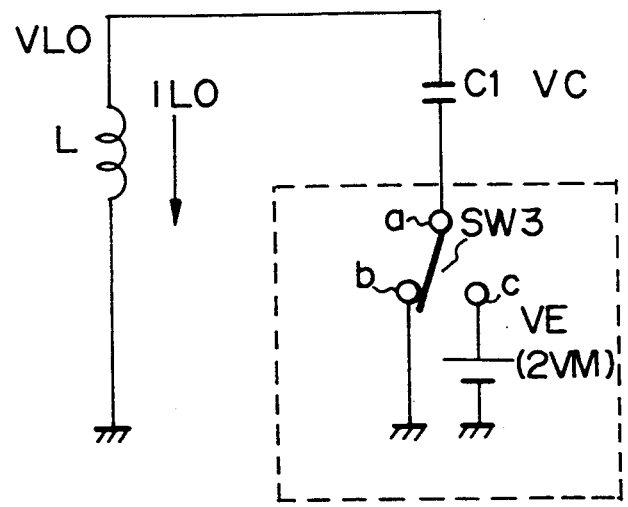
FIG. 5 is an equivalent circuit diagram of the principle of the invention.

Since it is actually difficult to realize the above circuit shown in FIG. 4, a construction of FIG. 5 is considered as an equivalent circuit. In FIG. 5, component element similar to those in FIG. 4 are designated by the same reference numerals and the overlapped description are omitted here.

In the construction of FIG. 5, one end side of the coil L is connected to ground and the capacitor C is connected to the other end side. The other end of the capacitor C is connected to the terminal a of the switch SW3. The resonance circuit is formed by the coil L and capacitor C mentioned above. A terminal b of a switch SW3 is connected to ground and a terminal c is connected to the positive polarity side of a power source voltage VE. The negative polarity side of the power source voltage VE is connected to ground.

In the circuit of FIG. 5, it is assumed that the coil L and the capacitor C are performing the resonance operation. It is also assumed that until time point t5 in FIGS. 3A and 3B, the connecting state of the switch SW3 is controlled and the terminals a and b of the switch SW3 are connected. It is now assumed that the power source voltage VE is set to [VE=2 VM].

For instance, at time point t5 in FIGS. 3A and 3B, the following equations are satisfied.

$$VL0 = VC = -VM$$

$$IL0 = -IM$$

At time point t5, when the connecting state of the switch SW3 is controlled and the terminals a and c of the switch SW3 are connected, the capacitor C and the power source voltage VE are serially connected. Thus, the voltage VL0 across both ends of the coil L is set as follows.

$$VL0 = -VM + VE = VM$$

[where, VE=2 VM]

In FIG. 5, since the state at time point t5 is set to the state at time point t7 as it is, the foregoing state at time point t7 can be reproduced. The resonance further progresses and at time point t1 the following equations are satisfied.

$$VL0 = VM$$

$$IL0 = IM$$

When the connecting state of the switch SW3 is controlled at time point t1 and the terminals a and b of the switch SW3 are again connected, the voltage VL0 across both ends of the coil L is set as follows.

$$VL0 = -VM$$

$$IL0 = IM$$

Since the state at time point t1 is set to the state at time point t3 as it is, the foregoing state at time point t3 can be reproduced. In a manner similar to the above, even in the circuit shown in FIG. 5, the waveforms of the voltage VL0 and deflection current IL0 shown in FIGS. 8A and 8B can be formed. The voltage VL0 and the deflection current IL0 can be used as a voltage and a current for the bidirectional deflection.

Figure 6:
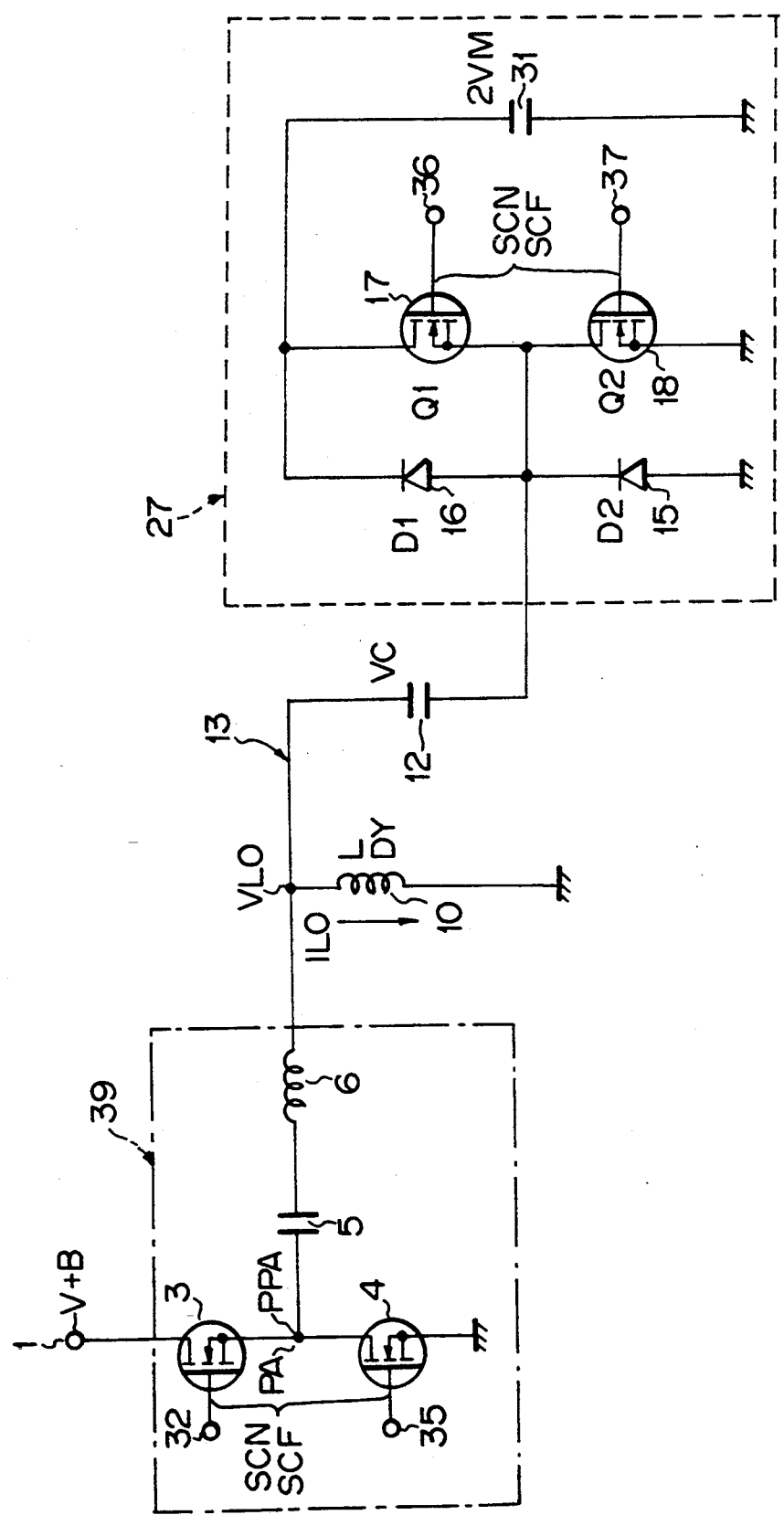
FIG. 6 is a circuit diagram showing an example in case of applying the principle circuit of the invention to the sine wave deflecting circuit.

FIG. 6 shows an example of an actual circuit based on the circuit shown in FIG. 5 mentioned above. In the circuit shown in FIG. 6, only the portions which are necessary for generation of the bidirectional deflection current and the AFC control are shown.

In the construction of FIG. 6, the power source voltage V+B is supplied to a drain of an FET 3 through a terminal 1.

A source of the FET 3 is connected to a drain of an FET 4 and one end side of a capacitor 5. A gate of the FET 3 is connected to a terminal 32. The drain of the FET 4 is connected to the source of the FET 3 and one end side of the capacitor 5. A source of the FET 4 is connected to ground. A gate of the FET 4 is connected to a terminal 35.

The capacitor 5 is connected to one end side of a coil 6. The capacitor 5 and the coil 6 are serially connected. The capacitor 5 is used to cut out the DC component. The coil 6 is used to smooth the signal.

The FETs 3 and 4 which are cascade connected, the capacitor 5, and the coil 6 form a driving section 39 to supply an energy to a resonance circuit 13.

One end side of a coil 10 as a deflecting yoke and one end side of a capacitor 12 are connected to the other end side of the coil 6. The coil 10 and capacitor 12 construct the resonance circuit 13. The other end side of the coil 10 is connected to ground. The other end side of the capacitor 12 is connected to a cathode of a diode 15, and anode of a diode 16, a source of an FET 17, and a drain of an FET 18, respectively. A cathode of the diode 16 and a drain of the FET 17 are connected to one end side of capacitor 31. The source of the FET 17 and the drain of the FET 18 are connected.

The anode of the diode 16, the cathode of the diode 15, and the other end side of the capacitor 12 are connected to a middle point of the source of the FET 17 and the drain of the FET 18, respectively. An anode of the diode 15, a source of the FET 18, and the other end side of the capacitor 31 are connected to ground. Gates of the FETs 17 and 18 respectively connected to terminals 36 and 37.

In the example shown in FIG. 6, a deflection current control circuit 27 is formed by the diodes 15 and 16, FETs 17 and 18, and capacitor 31. The operations of the FETs 17 and 18 of the deflection current control circuit 27 are controlled by control signals SCN and SCF which are supplied through the terminals 36 and 37. The control signals SCN and SCF are the signals similar to the control signals SCN and SCF which are supplied to the FETs 3 and 4, which will be explained hereinlater.

The operation will now be described with reference to FIGS. 3A and 3B, 6, and 8A to 8H.

FIG. 8A shows the voltage VL0. FIG. 8B shows the deflection current IL0. Time points t shown in FIGS. 8A and 8B are the same as the time points t shown in FIGS. 3A and 3B.

FIG. 8C shows the four intervals D1, Q1, D2, and Q2. FIGS. 8D to 8C, show periods of time during which the diodes 15 and 16, FETs 17 and 18, and the like are respectively turned on and off. FIG. 8H shows an example of a dynamic focus waveform.

It is now assumed that the voltage charged in the capacitor 31 in FIG. 6 is set to [2 VM]. This value of the voltage is equal to the value in the stationary state.

In the above driving section 39, the operations of the FETs 3 and 4 are controlled by the control signals SCN and SCF which are supplied through the terminals 32 and 35. The control signal SCN is used to turn on the FETs 3 and 4. The control signal SCF is used to turn off the FETs 3 and 4. Time durations of the control signals SCN and SCF are almost equal. Therefore, the FETs 3 and 4 of the driving section 39 are alternately driven at a duty ratio of about 50% and a rectangular wave signal PPA is formed. The rectangular wave signal PPA is supplied to the resonance circuit 13 through the capacitor 5 and coil 6 as an energy to continue the resonance.

In the resonance circuit 13 comprising the coil 10 and the capacitor 12, the parallel resonance is performed and the deflection current IL0 which is generated by the parallel resonance is used as a bidirectional current. As will be explained hereinlater, the deflection current IL0 is constructed by a part of the sine wave that is formed by the AFC control by the deflection current control circuit 27.

The AFC control is performed by the deflection current control circuit 27 and the voltage VL0 and deflection current IL0 shown in FIGS. 8A and 8B are formed. Explanation will now be made hereinbelow with respect to the above point.

The resonance circuit 13 executes the ordinary resonance for a period of time between time points t3 and t5 shown in FIGS. 8A and 8B. The diode 15 is turned on (hereinafter, referred to as a D2 interval) in a period of time between time points t3 and t4. The FET 18 is turned on in a period of time between time points t3a and t5.

In the above D2 interval, the deflection current IL0 flows in the direction shown in the diagrams along a path of the coil 10-ground-diode 15-capacitor 12-coil 10. Therefore, the voltage VL0 across both ends of the coil 10 increases from [−VM] in the negative direction.

Since the FET 18 is turned on in a period of time between time points t4 and t5 (hereinafter, referred to as a Q2 interval) as mentioned above, the deflection current IL0 flows along the path of the coil 10-capacitor 12-FET 18-ground-coil 10 in the direction opposite to the direction shown in the diagrams. Therefore, the voltage VL0 across both ends of the coil 10 decreases from the peak on the negative side toward the voltage [−VM] in the negative direction. The timing to turn on the FET 18 can be set to an arbitrary timing so long as the diode 15 is ON. Thus, at time point t4, the flowing direction of the deflection current IL0 is reversed. However, the flowing direction of the deflection current IL0 in the D2 interval is naturally different from that in the Q2 interval.

The diode 16 is ON (hereinafter, referred to as a D1 interval) for a period of time between time points t5 (=t7) and t8. The FET 17 is ON for a period of time between time points t5a and t1. After time point t5 (=t7), the diode 15 and FET 18 are turned off. When the FET 18 is turned off at time point t5 (=t7), the deflection current IL0 (=−IM) flows along the path of the coil 10-capacitor 12-diode 16-capacitor 31-ground-coil 10. Therefore, the voltage VL0 across both ends of the coil 10 increases from the voltage [VM] toward the peak in the positive direction.

In the stationary state, since the voltage charged in the capacitor 31 is equal to [2 VM] and at time point t5 (=t7) the voltage charged in the capacitor 12 is equal to [−VM], the voltage VL0 which is seen from the coil 10 side is equal to [VM] at time point t5 (=t7) in the D1 interval. Therefore, at the start point of the D1 interval, namely, at time point t5 (=t7), the inclination the deflection current IL0 is reversed from the increasing state to the decreasing state in the negative direction.

For a subsequent period of time between time points t8 and t1 (hereinafter, referred to as a Q1 interval), since the FET 17 is ON as mentioned above, the deflection current IL0 flows along the path of the coil 10-ground-capacitor 31-FET 17-capacitor 12-coil 10 from time point t8 in the direction shown in the diagrams. Consequently, the voltage VL0 across both ends of the coil 10 decreases to the voltage [VM] from the peak in the positive direction. The timing to turn on the FET 18 can be set to an arbitrary timing so long as it is turned on for the period of time during which the diode 16 is ON. At time point t8, thus, the flowing direction the deflection current IL0 is reversed. However, the flowing direction of the deflection current IL0 in the D1 interval is naturally different from that in the Q1 interval.

Accordingly, the voltage VL0 and deflection current IL0 shown in FIGS. 8A and 8B can be formed. The deflection current IL0 is a part of the sine wave shown in FIG. 3B. The waveform of the deflection current IL0 is fundamentally different from the waveform such that the S-character characteristics are provided for the triangular waveform which has been considered to be a current for the bidirectional deflection since a long time ago. Since the deflection current IL0 is a part of the sine wave, its waveform is very suitable for the bidirectional deflection in the linearity or symmetry.

By properly selecting the voltage VE shown in FIG. 5 and the resonance frequency of the coil L and capacitor C, the portion that can be used in the sine wave can be freely changed, so that the optimum waveform can be easily selected for the linearity on the screen that changes in dependence on the shape of CRT, deflection angle, and distance from the center of the deflection.

Similarly, since a blanking period can be freely set, the invention can be also easily applied to a receiver set such as, a high-vision set in which the blanking period is very short and a deflecting circuit having no blanking period can be also realized. If necessary, the time base of the video signal can be also extended. The luminance and spot characteristics can be improved or the frequency characteristics of the signal processing circuit can be also equivalently improved by reducing the frequency of the horizontal scan line.

As for a correction waveform for a dynamic focusing, it is sufficient to apply almost the same voltage in the right and left portions which are away from the central position of the CRT by an equal distance. Therefore, as shown in FIG. 8H, as a correction waveform for the dynamic focusing, it is necessary to form a waveform which is symmetrical with respect to the time point t3 (=t1) as a center. This is because the image is formed on the screen by the reciprocating scans. Such a point fundamentally differs from the case where it is sufficient to repetitively form the same waveform every horizontal scan period as in the conventional one-way scan.

Figure 7:
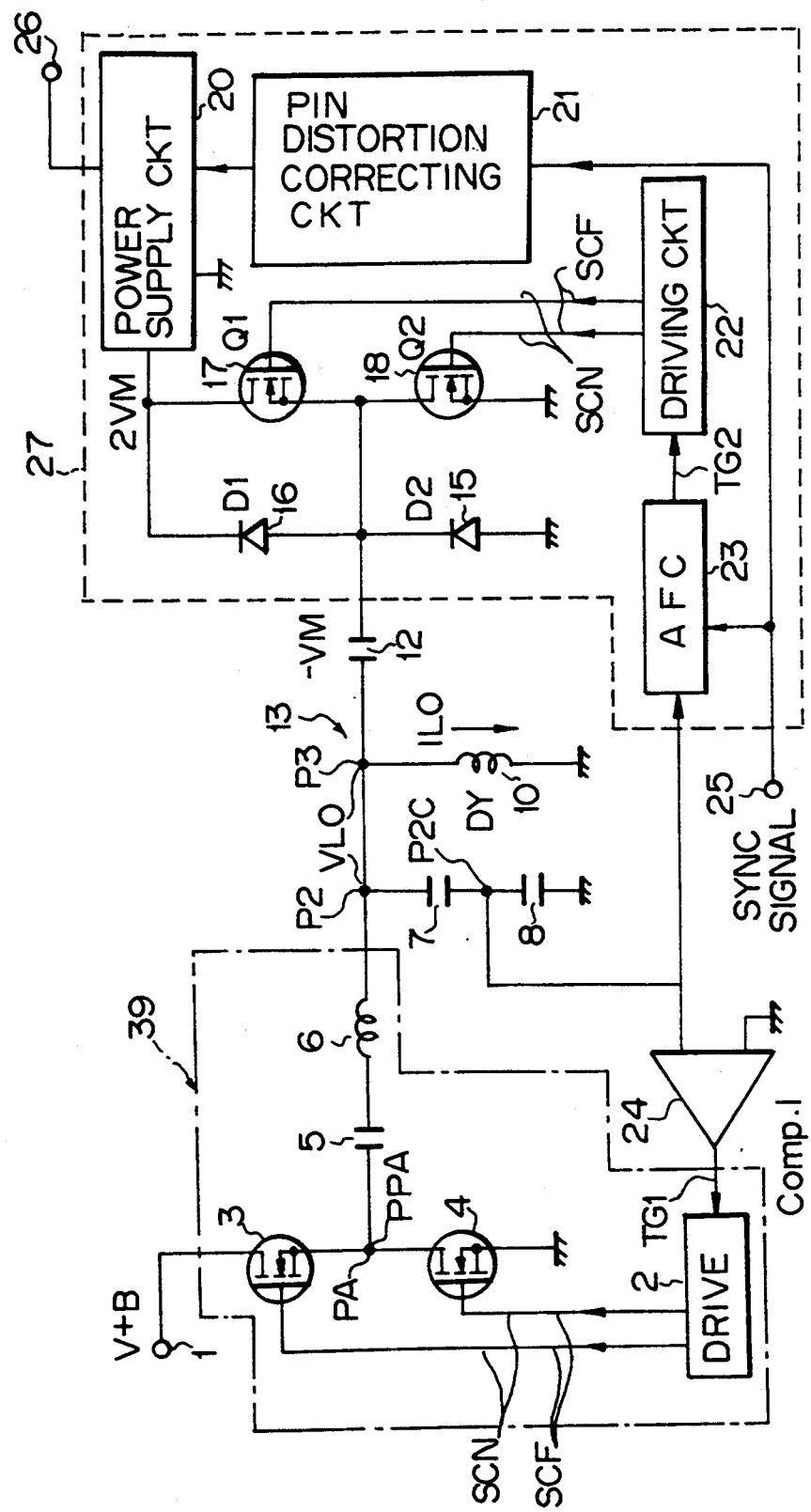
FIG. 7 is a circuit diagram showing an embodiment of a sine wave deflecting circuit of the invention.

Another embodiment of the invention will now be described hereinbelow. FIG. 7 is a diagram for explaining this embodiment of the invention.

According to the embodiment shown in FIG. 7, the deflection current control circuit 27 shown in FIG. 6 mentioned above is used and the AFC control is performed to the deflection current IL0 and voltage VL0 by the switching of the FETs 17 and 18, and a waveform of the deflection current IL0 of a good linearity is obtained.

A construction of the embodiment shown in FIG. 7 differs from the construction shown in FIG. 6 mentioned above with respect to the following points. In FIG. 7, parts and components similar to those shown in FIG. 6 are designated by the same reference numerals and their overlapped descriptions are omitted here.

First, the driving section 39 is constructed by a driving circuit 2, FETs 3 and 4, capacitor 5, coil 6, and the like. The gates of the FETs 3 and 4 are connected to the driving circuit 2. The output side of a comparator 24, which will be explained hereinlater, is connected to the driving circuit 2.

By supplying the control signals SCF and SCN from the driving circuit 2 to the gates of the FETs 3 and 4, the operations of the FETs 3 and 4 are controlled. The connecting states among the terminal 1, FETs 3 and 4, capacitor 5, and coil 6 are similar to those in the construction shown in FIG. 6.

Capacitors 7 and 8 which are serially connected are arranged between the point P2 between the outer end side of the coil 6 and the resonance circuit 13 and ground, and the comparator 24 is provided.

The middle point P2C of the capacitors 7 and 8 and one terminal of the comparator 24 are connected. The other terminal of the comparator 24 and the other end side of the capacitor 8 are connected to ground. This is because the voltage VL0 which is generated across both ends of the coil 10 is divided by the capacitors 7 and 8 and the potential at the middle point P2C of the capacitors 7 and 8 is detected. The other terminal of the comparator 24 is connected to ground. Therefore, in the comparator 24, a zero-cross point of the voltage VL0 is detected on the basis of the potential at the middle point P2C.

A power supply circuit 20, a pin distortion correcting circuit 21, a driving circuit 22, and an AFC circuit 23 are provided in the deflection current control circuit 27.

A potential at the middle point P2C of the capacitors 7 and 8 is supplied to the AFC circuit 23. A sync signal is also supplied from a terminal 25 to the AFC circuit 23. A trigger signal TG2 for the AFC control is supplied from the AFC circuit 23 to the driving circuit 22. An output terminal of the driving circuit 22 is connected to the gates of the FETs 17 and 18, thereby controlling the ON/OFF states of the FETs 17 and 18.

In the pin distortion correcting circuit 21, a signal of parabolic waveform of one vertical scan period to correct a pin distortion is formed on the basis of a sync signal that is supplied from the terminal 25. Such a signal is supplied to the power supply circuit 20.

The power supply circuit 20 forms a predetermined voltage [2 VM] on the basis of the power source voltage which is supplied through a terminal 26. The voltage [2 VM] is modulated on the basis of the signal of the parabolic waveform for the pin distortion correction which supplied from the pin distortion correcting circuit 21. The voltage [2 VM] is supplied to the cathode of the diode 16, the drain of the FET 17, and the like. The power supply circuit 20 is equivalently considered as a capacitor 31 shown in FIG. 6.

The circuit operation will now be described with reference to FIG. 7.

The coil 10 and the capacitor 12 executes the parallel resonance and the deflection current IL0 which is generated by the resonance is used as a bidirectional current. The voltage VL0 which is generated across both ends of the coil 10 is divided by the capacitors 7 and 8. The voltage which is obtained at the middle point P2C of the capacitors 7 and 8 is supplied to one terminal of the comparator 24 and to the AFC circuit 23.

The other terminal of the comparator 24 is connected to ground. The voltage at the middle point P2C mentioned above is compared with ground level by the comparator 24. A trigger signal TG1 is formed when the voltage at the middle point P2C, namely, the voltage VL0 zero-crosses. The trigger signal TG1 is supplied to the driving circuit 2. The driving circuit 2 forms the control signals SCN and SCF on the basis of the trigger signal TG1 and supplies them to the FETs 3 and 4. The FETs 3 and 4 are alternately driven for the same time duration (namely, duty ratio of 50%) by the control signal SCN and SCF.

The rectangular wave signal PPA having an amplitude of V+B and a duty ratio of about 50% is formed at a middle point PA of the FETs 3 and 4. The rectangular wave signal PPA is supplied to the resonance circuit 13 through the capacitor 5 to cut the DC component and the smoothing coil 6. Thus, energy is supplied to the resonance circuit 13 and the oscillation is continued.

The rectangular wave signal PPA always keeps a predetermined phase relation for the resonance waveform formed by the resonance circuit 13. This is because although an amount of energy which is supplied to the resonance circuit 13 is determined by a phase difference of the signals appearing at the middle point PA and the point P3, since Q of the resonance circuit 13 is high, an oscillation amplitude changes greatly due to a slight increase or decrease of energy supplied. This is because, therefore, to execute the stable oscillation so that the amplitude of the resonance waveform in the resonance circuit 13 becomes constant, the phase relation between the signals appearing at the middle point PA and the point P3 must be held constant.

The above loop of the driving section 39-capacitors 7 and 8-(middle point P2C)-comparator 24-driving circuit 2-FETs 3 and 4-capacitor 5-coil 6-capacitors 7 and 8 (middle point P2C) is provided to lock the phases of the resonance system and the driving system, thereby keeping the amplitude of the resonance waveform constant.

In the AFC circuit 23, by switching the FETs 17 and 18 through the driving circuit 22, the AFC control is executed to the voltage VL0 and deflection current IL0 so that the deflection current IL0 shown in FIG. 8B is formed. Since the AFC control to the voltage VL0 and the deflection current IL0 and the formation of the deflection current IL0 have already been described in detail in FIG. 6, their overlapped descriptions are omitted here.

In the AFC circuit 23, the phases are compared between the voltage VL0, for example, the edge portion of the waveform, and the signal which is formed on the basis of a sync signal that is supplied through the terminal 25, so that phase difference is formed. To eliminate the phase difference, the trigger signal TG2 is formed and supplied to the driving circuit 22.

In the driving circuit 22, the ON/OFF timings of the FETs 17 and 18 are controlled on the basis of the trigger signal TG2. As will be obviously understood from FIGS. 8A to 8H, by controlling the duration of the interval Q1 to turn on the FET 17 and the duration of the interval Q2 to turn on the FET 18, the AFC control a the voltage VL0 and deflection current IL0 can be performed and the deflection current IL0 shown in FIG. 8B can be formed.

According to the embodiment, since the FETs 17 and 18 are turned off for the interval D1, the deflection current IL0 flows to the capacitor 12 and the power supply circuit 20 through the diode 16. Since the FET 17 is turned on the FET 18 is turned off for the interval Q1, the deflection current IL0 flows to the capacitor 12 and power supply circuit 20 through the FET 17 in the direction opposite to that in the interval D1. In the intervals D1 and Q1, the voltage VL0 across both ends of the coil 10 is set to [VL0 VM].

According to the embodiment, since the FETs 17 and 18 are turned off in the interval D2, the deflection current IL0 flows through the diode 15 and the capacitor 12. Since the FET 18 is turned on and the FET 17 is turned off in the interval Q2, the deflection current IL0 flows through the FET 18 and the capacitor 12 in the direction opposite to that in the interval D2. The voltage VL0 across both ends of the coil 10 is set to [VL0 −VM] in the intervals D2 and Q2.

As mentioned above, by switching the FETs 17 and 18, the AFC control to the voltage VL0 and deflection current IL0 is performed and the deflection current IL0 and voltage VL0 in which the overscan portions shown in FIGS. 8A and 8B do not exist can be formed.

Therefore, in the bidirectional deflection, there is no need to use the overscan portions and the deflection current IL0 of the portion of the best linearity shown in FIGS. 8A and 8B can be used as a current for the bidirectional deflection and the linearity of the image which is displayed on the screen can be improved.

As mentioned above, since there is no need to use the overscan portions in the bidirectional deflection, even in case of displaying a video image on the screen by the ordinary image size, any special countermeasure is unnecessary.

For instance, since there is no need to compress the time base of the video signal, it is unnecessary to raise the horizontal scanning frequency and to increase a beam current or a driving amount to increase the brightness of the scan. Consequently, a spot shape of the beam is not adversely influenced, the focusing characteristics are not deteriorated, and the reduction of the life of the CRT can be prevented. On the other hand, since there is no need to raise the horizontal scanning frequency, it is unnecessary to improve the frequency characteristics of the signal processing system and the circuit to drive the CRT and it is also unnecessary to improve the digital processing speed. It is also unnecessary to increase the radius of curvature of the screen of the CRT or the deflection angle. Further, since there is also no need to modulate the time base of the video signal along the linearity, it is possible to prevent that the circuit becomes complicated and the occurrence of drawbacks such as variation in luminance, variation in resolution and the like can be prevented.

Since the blanking period can be freely set, the invention can be also easily applied to a set such as a high vision set in which the blanking period is very short. A deflecting circuit having no blanking period can be also realized. Further, if necessary, the time base of the video signal can be also extended. The luminance and spot characteristics can be improved and the frequency characteristics of the signal processing circuit can be also equivalently improved by reducing the frequency of the horizontal scan line.

Figure 9:
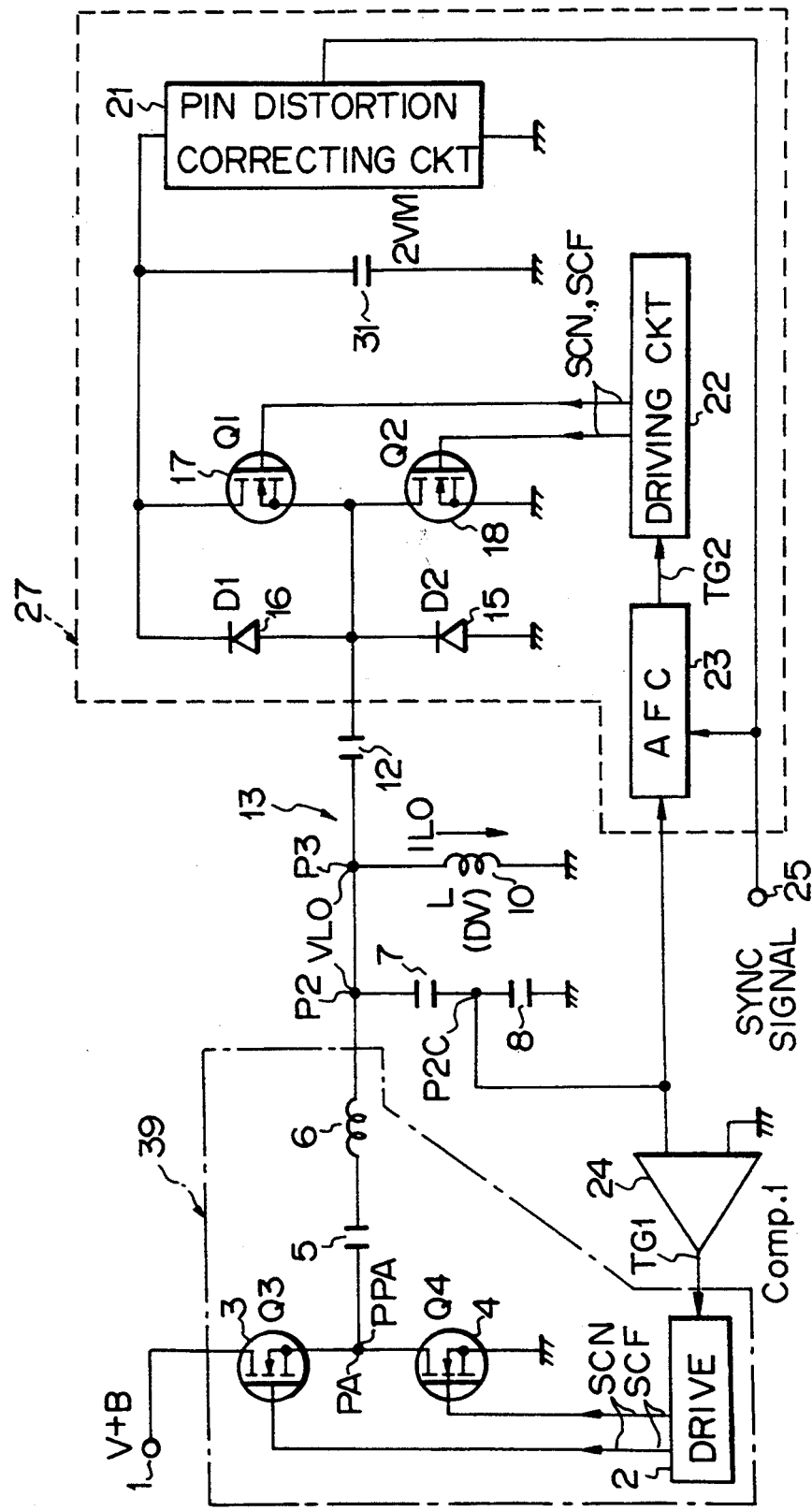
FIG. 9 is a block diagram showing another embodiment of a sine wave deflecting circuit of the invention.

Another embodiment of the invention will now be described. FIG. 9 is a diagram for explaining another embodiment of the invention. A construction of the embodiment shown in FIG. 9 differs from the construction shown in the foregoing embodiment with respect to the following points. In FIG. 9, component elements similar to those in the foregoing embodiment are designated by the same reference numerals and their overlapped descriptions are omitted here.

The power supply circuit 20 in the deflection current control circuit 27 is deleted and the cathode of the diode 16 and the drain of the FET 17 are connected to the pin distortion correcting circuit 21. One end side of the capacitor 31 is connected to the node of the pin distortion correcting circuit 21, the cathode of the diode 16 and, the drain of the FET 17. The other end of the capacitor 31 is connected to ground.

In another embodiment, the voltage [2 VM] which is supplied from the pin distortion correcting circuit 21 is held in the capacitor 31 in the stationary state.

As for the content in another embodiment, the power supply circuit 20 shown in the foregoing embodiment is merely replaced by the capacitor 31 and the other contents are similar to those in the foregoing embodiment. Therefore, portions common to those in the above embodiment are designated by the same reference numerals and their overlapped descriptions are omitted here.

Figure 10:
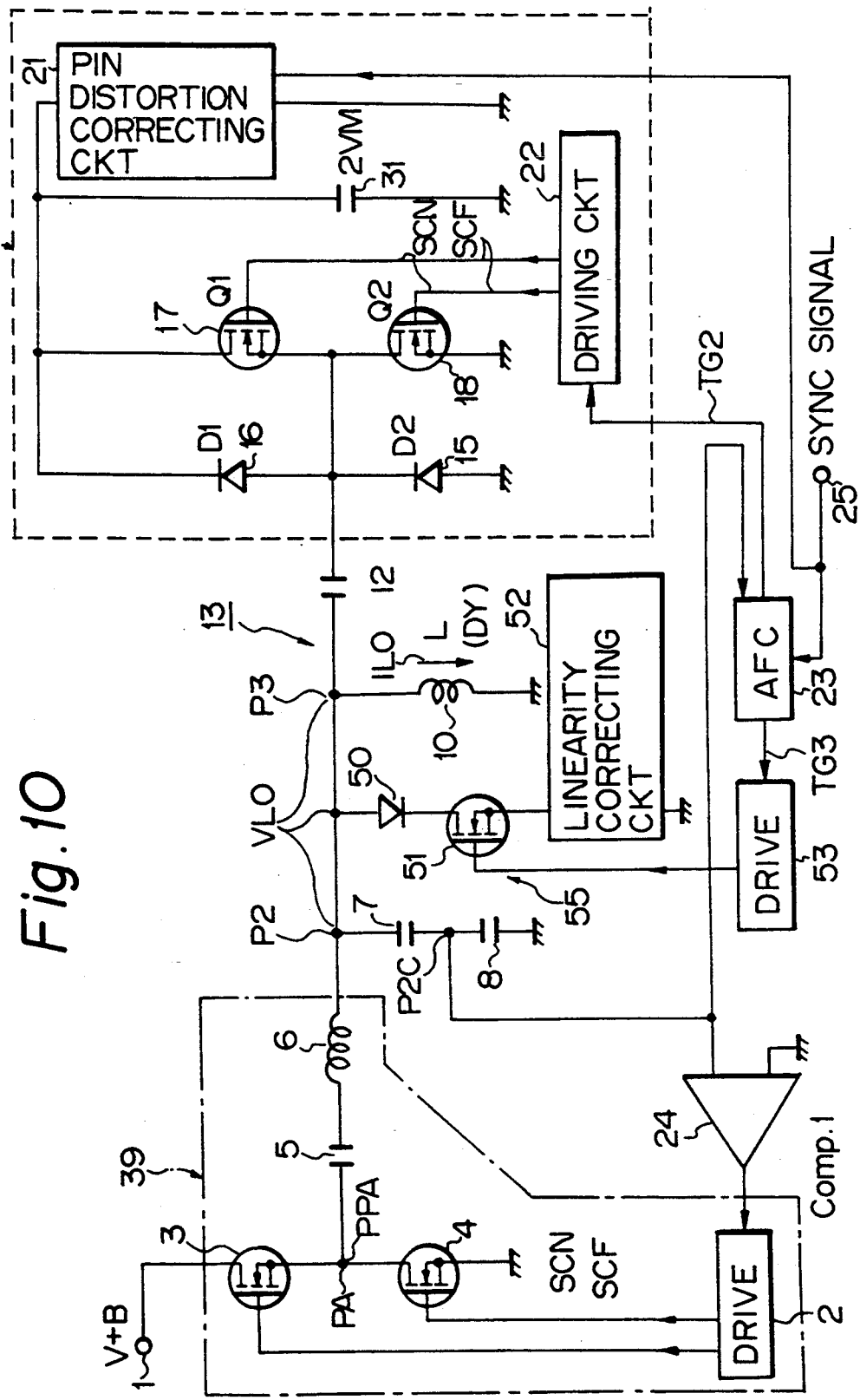
FIG. 10 is a block diagram showing still another embodiment of a sine wave deflecting circuit of the invention.

Still another embodiment of the invention will now be described. FIG. 10 is a diagram for explaining still another embodiment of the invention.

A construction of the embodiment shown in FIG. 10 differs from the constructions shown in the foregoing two embodiments with respect to the following points. Portions common to those in the above two embodiments are designated by the same reference numerals and their overlapped descriptions are omitted here.

First, the deflection current control circuit 27 is constructed by the diodes 15 and 16, FETs 17 and 18, driving circuit 22, capacitor 31, and pin distortion correcting circuit 21. The AFC circuit 23 is provided independently of the deflection current control circuit 27. Since the other connecting state operations and the like are substantially the same as those in the above embodiments, their descriptions are omitted here.

A switching circuit 55 which is constructed by serially connecting a diode 50, an FET 51, and a linearity correcting circuit 52 is provided between the points P2 and P3 and ground. A driving circuit 53 to control the FET 51 is provided.

This embodiment differs from the above two embodiments with respect to a method of performing the AFC control.

According to the above two embodiments, by controlling the ON/OFF timings of the FETs 17 and 18 of the deflection current control circuit 27, the durations of the intervals Q1 and Q2 are adjusted, thereby executing the whole AFC control of the voltage VL0 and deflection current IL0.

In addition to the AFC control which is performed by the above two embodiments, according to this embodiment, as shown in FIG. 10, by allowing the deflection current IL0 to flow along the path of the coil 10-switching circuit 55-ground-coil 10, both ends of the coil 10 are short-circuited, thereby stopping the changes in the voltage VL0 and deflection current IL0 and stopping the operation of the resonance circuit 13 for an arbitrary time. Due to this, the apparent frequency is controlled and the AFC control is executed.

As shown in FIGS. 11A and 11B, in a period of time from time point t4 when the voltage VL0 is maximum on the negative side and the deflection current IL0 is equal to 0 to time point t5 when the voltage VL0 is equal to 0 and the current IL0 reaches the maximum predetermined level on the negative side, a trigger signal TG3 is supplied form the AFC circuit 23 to the driving circuit 53. On the basis of the trigger signal TG3, the control signal SCN is formed in the driving circuit 53 and is supplied to a gate of the FET 51. As a result, the FET 51 is turned on. Further, the diode 50 is turned on at time point t5. Thus, the switching circuit 55 is turned on.

When the switching circuit 55 is turned on, both ends of the coil 10 are short-circuited and the energy accumulated in the coil 10 flows as a deflection current IL0 along the path of the coil 10-diode 50-FET 51 -linearity correcting circuit 52-ground-coil 10 and is preserved. Therefore, the deflection current IL0 flows while keeping the maximum predetermined level on the negative side for a period of time between time points t5 and t7 shown in FIG. 11B.

As mentioned above, the voltage VL0 across the coil 10 is set to 0 for such a period of time between time points t5 and t7. For a period of time between time points t5 and t7 during which the AFC control is executed, the linearity correcting circuit 52 executes the correcting operation to prevent a decrease in the deflection current IL0.

In the linearity correcting circuit 52, the voltage VL0 drops due to factors such a resistance component r of the coil 10, forward direction voltage drop of the diode 50, and the like on the path along which the deflection current IL0 flows, so that the deflection current IL0 decreases in the negative direction. Therefore, the linearity correcting circuit 52 is provided so as to prevent such a reduction of the deflection current IL0. That is, by fixing the potential on the source side of the FET 51 to a predetermined potential on the negative side, the drop of the voltage VL0 is prevented, thereby correcting a decrease in the deflection current IL0 in the negative direction.

In the AFC circuit 23, at a time point t7 when the time to perform the AFC control is finished, the trigger signal TG3 is formed to turn off the FET 51. The trigger signal TG3 is supplied from the AFC circuit 23 to the driving circuit 53. The control signal SCF to turn off the FET 51 is formed in the driving circuit 53 on the basis of the trigger signal TG3 and is supplied to the gate of the FET 51. When the control signal SCF is supplied to the gate of the FET 51, the FET 51 is turned off and the switching circuit 55 is also turned off. Thus, the foregoing path of the deflection current IL0 is shut off.

As shown in FIGS. 11A and 11B, therefore, the states of the voltage VL0 [=0] and the current IL0 [=the maximum predetermined level on the negative side] are continued for a period of time between time points t5 and t7. That is, such a period of time between t5 and t7 is a rest interval. By controlling the duration of the rest interval and by maintaining the state in which the whole resonance energy during the rest interval is accumulated into the coil 10, the apparent resonant frequency is changed, thereby performing the AFC control.

As shown in FIG. 11C, as for the correction waveform for dynamic focusing in still another embodiment, it is sufficient to apply almost the same voltages in the right and left portions which are away from the central position of the CRT by an equal distance, so that a waveform which is symmetrical with respect to a time point t3 in FIG. 11C as a center is derived. However, one end side of the correction waveform is extended as shown in an area AR10 in FIG. 11C for a period of time during which the AFC control is executed and the resonance is stopped.

Therefore, the correction waveform for dynamic focusing in the period of time between time points t5 and t7 during which the resonance is stopped is different from that in each of the above two embodiments.

Since the other contents in this embodiment are similar to those in the foregoing two embodiments, portions common to those in the above two embodiments are designated by the same reference numerals and their overlapped descriptions are omitted here.

In the specification, a term "linearity" means that the scanning speed is always kept constant. That is, in the case where there is a change in scanning speed in the horizontal scan line, for instance, when there is a change in scanning speed between the right and left sides of the central position, extension or contraction occurs in the right and left images. To prevent such an extension or contraction of the image, accordingly, the horizontal scanning speed needs to be always held constant and such a process is called "linearity".

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

For instance, although the FETs 3, 4, 17, 18, and 51 have been used as switching elements in the above embodiments, the invention is not limited to them. Arbitrary switching elements such as transistors, IGBTs, thyristors, or the like can be used so long as they can be used as switching elements.

Although the rectangular wave signal PPA has been supplied as an energy to the resonance circuit 13 in the above embodiments, the invention is not limited to it. An arbitrary waveform can be used. The method of performing the AFC control is also not limited to that mentioned in each of the above embodiments.

According to the sine wave deflecting circuit of the invention, the deflection current and deflection voltage without any overscan portion can be formed. Thus, the deflection current of the portion having the best linearity can be used as a current for the bidirectional deflection and the linearity of the image can be improved.

Since there is no need to use the overscan portions, even in case of displaying the video image onto the screen by the ordinary image size, there is no need to take any special countermeasure. For instance, since it is unnecessary to compress the time base of the video signal, there is no need to raise the horizontal scanning frequency. There is also no need to increase the beam current or driving amount in order to increase the brightness of the screen. Therefore, the spot shape of the beam is not adversly influenced. The focusing characteristics are not deteriorated and a decrease in life of the CRT can be prevented. Since there is no need to raise the horizontal scanning frequency, it is unnecessary to improve the frequency characteristics of the signal processing system and the circuit to drive the CRT and to improve the digital processing speed. It is also unnecessary to increase the radius of curvature of the screen of the CRT or to increase the deflection angle. Further, there is no need to modulate the time base of the video signal along the linearity, so that it is possible to prevent the circuit becoming complicated and the occurrence of the drawbacks such as luminance variation, resolution variation, and the like can be prevented.

Since the blanking period can be freely set, the invention can be also easily applied to the set such as a high vision set in which the blanking period is very short. The deflecting circuit having no blanking period can be also realized.

Further, if necessary, the time base of the video signal can be also extended. The luminance and spot characteristics can be improved. The frequency characteristics of the signal processing circuit can be also equivalently improved by reducing the frequency of the horizontal scan line.

What is claimed is:

1. A sine wave deflecting circuit which has a resonance circuit comprising a deflecting coil and a resonance capacitor and a circuit for detecting a signal waveform of the resonance circuit and for driving the resonance circuit on the basis of the detection signal and in which the deflecting coil is sine-wave driven by a self-oscillation,
   including a rectangular wave driving circuit having a first pair of FETs connected in cascade and the rectangular wave driving circuit being connected through a capacitor to one end of the deflecting coil; in which the circuit for detecting the signal waveform comprises:
   first and second capacitors connected in series between the one end of the deflecting coil and ground;
   a comparator for comparing a voltage at a junction between said first and second capacitors connected in series and ground potential and producing a first trigger signal for controlling on and off states of said first pair of FETs; and the sine wave deflecting circuit further comprising
   a deflection current control circuit including a second pair of FETs connected in cascade and an automatic frequency control circuit connected to said voltage at said junction between said first and second capacitors and to a sync signal for producing a second trigger signal for controlling on and off states of said second pair of FETs, said second pair of FETs being connected to said one end of the deflecting coil for controlling current flow therethrough.

2. A deflecting circuit according to claim 1, wherein said first and second switching elements are alternately driven at a duty ratio of about 50% by predetermined control signals.

3. A deflecting circuit according to claim 1 or 2, wherein a smoothing coil is connected between one end of said deflecting coil and said capacitor.

4. A sine wave deflecting circuit comprising:
   a resonance circuit having a resonance capacitor and a deflecting coil, the deflecting coil being sine-wave driven by a self-oscillation;
   a rectangular wave driving circuit for driving the resonance circuit on the basis of a detection signal waveform, the rectangular wave driving circuit having a first pair of FETs connected in cascade and being connected through a capacitor to one end of the deflecting coil;
   a detecting circuit for detecting the detection signal waveform of the resonance circuit, the detecting circuit having first and second capacitors connected in series between the one end of the deflecting coil and ground and a comparator for comparing a voltage at a junction between said first and second capacitors connected in series and ground potential and producing a first trigger signal for controlling on and off states of said first pair of FETs; and
   a deflection current control circuit having a second pair of FETs connected in cascade and an automatic frequency control circuit connected to said voltage at said junction between said first and second capacitors and to a sync signal for producing a second trigger signal for controlling on and off states of said second pair of FETs, said second pair of FETs being connected to said one end of the deflecting coil for controlling current flow therethrough.

* * * * *